April 15, 1969 J. M. SIPRESS ET AL 3,439,330

ERROR DETECTION IN PAIRED SELECTED TERNARY CODE TRAINS

Filed June 4, 1965 Sheet 1 of 4

ERROR AND SUBSEQUENT REMOVAL OF VIOLATION OF (+3,-2) PROPERTY

ERROR AND SUBSEQUENT REMOVAL OF VIOLATIONS OF (+2,-1) PROPERTY

LEVELS OF BISTABLE CIRCUITS AFTER A VIOLATION OF (+1,0) PROPERTY

INVENTORS J. M. SIPRESS
E. ZARINS
BY Leonard D. Arnold
ATTORNEY

United States Patent Office 3,439,330
Patented Apr. 15, 1969

3,439,330

ERROR DETECTION IN PAIRED SELECTED TERNARY CODE TRAINS

Jack M. Sipress, Summit, and Egils Zarins, East Orange, N.J., assignors to Bell Telephone Laboratories, Incorporated, New York, N.Y., a corporation of New York Filed June 4, 1965, Ser. No. 461,382
Int. Cl. G08b *29/00, 25/00;* H04l *1/00*
U.S. Cl. 340—146.1 6 Claims

ABSTRACT OF THE DISCLOSURE

An error detection system for use in a pulse communication system employing a specially constrained code known as the paired selected ternary code. This code insures that no direct current component exists and that a long train of spaces will not be transmitted, thus facilitating the use of self-timed repeaters in a PCM system. The received code is examined by the apparatus of the invention to detect errors by monitoring the algebraic sum of the paired selected ternary signal (PST) and examining that sum for violations of the PST code. In the event that a violation is detected the output signal is altered to eliminate the violation.

This invention relates to pulse code modulation (PCM) and more particularly to the detection and measurement of errors in a specially constrained code.

The specially constrained code with which we are here concerned is the so-called paired selected ternary code disclosed in copending application, Ser. No. 335,014, filed by J. M. Sipress on Jan. 2, 1964 now Patent No. 3,302,193, issued on Jan. 31, 1967. In accordance with that invention, a binary pulse signal is converted into a three state signal of positive pulses, negative pulses and spaces in accordance with a first predetermined code set until a three state signal is generated having a predetermined direct current component, whereupon the conversion is accomplished in accordance with a second predetermined code set until a three state signal having a second predetermined direct current component is generated and the conversion again carried out in accordance with the first code. The resulting code comprising two code sets insures that as a result of the conversion the resulting three state signal has no direct current component and that a long train of spaces will not be transmitted, thus facilitating the use of self-timed repeaters in a PCM system.

More specifically, the input signal is divided into words of two bits each which are then encoded into three level codes in accordance with either of two codes shown below:

| Binary word | Code No. 1 | Code No. 2 |
|---|---|---|
| 1, 1 | +1, −1 | +1, −1 |
| 1, 0 | +1, 0 | −1, 0 |
| 0, 1 | 0, +1 | 0, −1 |
| 0, 0 | −1, +1 | −1, +1 |

The conversion from binary code to the three level code is accomplished by first dividing the binary input signal into successive two-bit words which are then converted in accordance with code number 1. When a code word, the algebraic sum of the amplitude of whose bits is +1 unit, is generated in accordance with code number 1 (i.e., for binary words 1, 0 or 0, 1), the equipment, after generating the code word, switches over to convert the binary words to three level code words in accordance with code number 2. The generation of a word in accordance with code number 2 whose sum is −1 unit (i.e., for binary words 1, 0 or 0, 1) causes the equipment to switch back to the use of code number 1. Because the equipment switches from one code to the other in response to a generated code word, the algebraic sum of the amplitudes of whose bits is not zero (either +1 unit or −1 unit), the resulting output signal has no direct current component. As a result, there is no drift of the direct current level to make regeneration difficult. In addition, and most important to the transmission of digital information over a transmission system employing self-timed repeaters, is the fact that the resulting pulse train cannot contain more than two consecutive spaces.

As it is true with other codes, the fact that the transmitted code is of the paired selected ternary type does not, of course, render it immune from errors. Thus, for example, spurious signals, such as noise bursts, may be added to the paired selected ternary pulse train during transmission from one point to another, and thereby alter the information content of the pulse train. It is important in the installation and maintenance of PCM systems to be able to detect and measure errors in the code, and an error detector capable of making this detection should, ideally, be capable of checking system performance without requiring an interruption of normal communications. In addition, such an error detector should be capable of checking system performance between any two points of the transmission system and should be capable of modifying the received signal prior to retransmission so that error detectors located further along the transmission system will not detect any errors save those introduced between it and the first error detector.

It is the primary object of this invention to accomplish these ends.

In accordance with this invention, errors are detected by monitoring the algebraic sum of the paired selected ternary signal (PST) and examining that sum for violations of the PST code. Three properties of the PST signal may be monitored by an algebraic sum detector. They are:

(1) The property that the algebraic sum of the PST signal cannot reach +3 units in the positive direction or −2 units in the negative direction.

(2) The property that the +2 and −1 levels must be immediately followed by the +1 and zero levels; and (3) The property that the level at the end of a PST word must be either +1 or zero.

The incoming signal is regenerated only in the absence of the detected violations of these properties, and in the event that a violation is detected the output signal is altered to eliminate the violation so that error detectors further along the transmission medium will only record errors introduced in the transmission path between the location of the first detector and the subsequent detector.

A better understanding of the invention will be obtained after considering the following detailed description taken in conjunction with the drawings in which.

Figure 1:
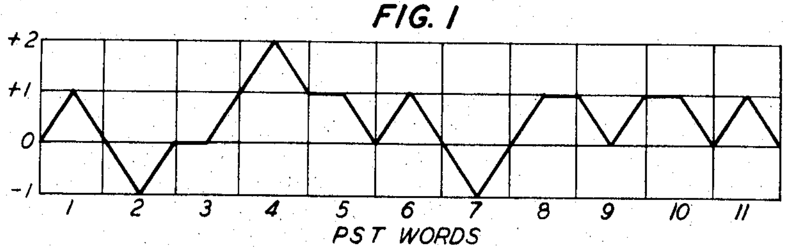
FIG. 1 is a typical PST pulse transmission signal.

In FIG. 1 the algebraic sum of the levels of a typical PST pulse transmission signal are shown with the levels plotted as the ordinate and each PST word occupying a unit of time composed of two time slots or bits on the abscissa. In this figure and in FIGS. 2, 5 and 8 the occurrence of a positive pulse is shown as a sloping line leading up one level during the bit interval of the pulse, a negative pulse by a line segment leading down one level, and an absence of a pulse by a horizontal line segment. The level at the end of a bit interval is the algebraic sum of the pulses (positive pulses taken as +1 and negative pulses as −1) over an interval starting at an arbitrarily prescribed time. This sum can only have four values or levels, and when the signal is considered to start at the beginning of a word encoded with code set + the possible levels are −1, 0, +1, and +2. It can be shown mathematically that regardless of the point in time at which it is assumed that the input signal starts, the same results hold true.

Figure 2:
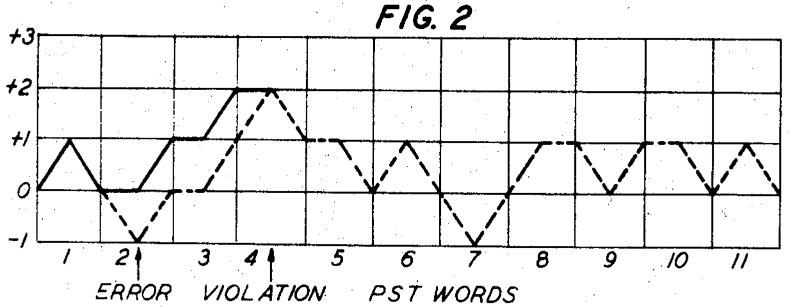
FIG. 2 illustrates the manner in which an error causes the PST signal to violate the above-mentioned +3, −2 property.

To illustrate, the first word shown in FIG. 1 is the PST word +1, −1. The second word is the PST word −1, +1. The third word is the PST word 0, +1 and so forth. FIG. 2 shows the result of an error occurring during the second PST word in which the PST signal as shown in FIG. 1 should have been −1, +1 but, instead, due to a noise error, appeared as 0, +1. The PST signal which should have been received is shown by the dotted line in FIG. 2 and this dotted line corresponds to the signal shown in FIG. 1. During the second word, due to the occurrence of the error, the received signal, shown by the solid line, deviates from the signal without an error present and this deviation continues until the occurrence of the fourth word. Reference to FIG. 1 shows that the amplitude level of the PST signal without any error should never exceed +2 units or −1 units of amplitude. During the occurrence of the fourth word of the PST signal, the PST signal would, as a result of the error in the transmission of the second word, go to +3 units of amplitude since the fourth word transmitted is +1, −1. In accordance with this invention, this violation is recorded and the received signal is regenerated in such a manner that the output signal cannot exceed +2 units of amplitude. As a result, during the first bit of the fourth word the output signal from the error detection and violation removal circuit is constrained to +2 units of amplitude, so that upon the occurrence of the second bit of the fourth word the regenerated signal and the ideal signal are again at the same level. As a result, the violation of the PST signal has been removed from the PST signal retransmitted over the transmission line. The next error detector along the transmission path will detect only those violations which occur as a result of errors introduced during transmission between it and the preceding error detector. As a result, in accordance with this invention, the portion of the transmission medium which is causing the errors in transmission may be easily isolated and the trouble corrected.

Figures 3, 4:
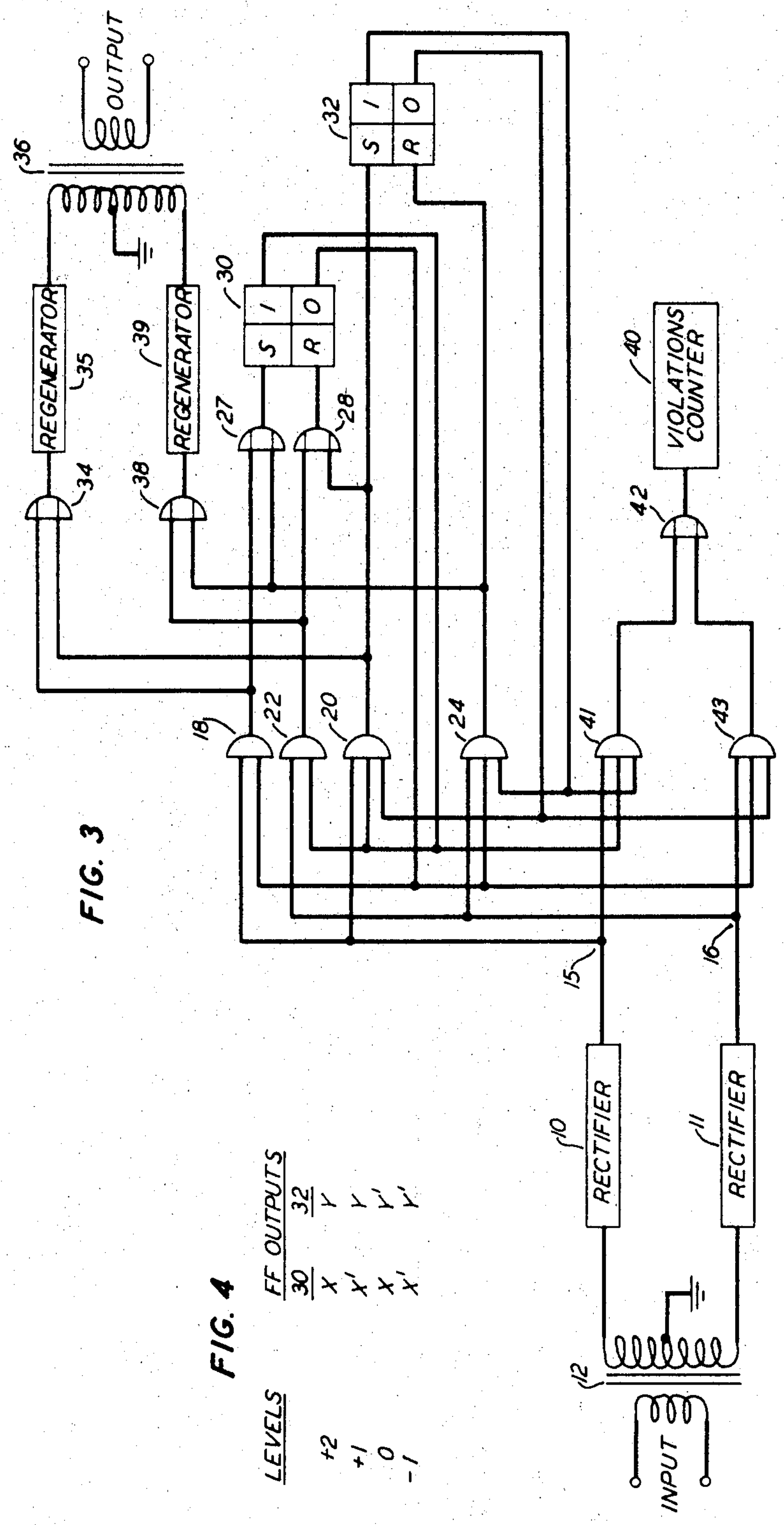
FIG. 3 is a block diagram of an illustrative embodiment of the invention which detects errors of the +3, −2 property.
FIG. 4 is a table of the states of the bistable circuits shown in FIG. 3 versus the algebraic sum of the PST signal.

An error detector and violation removal circuit embodying this invention which examines the amplitude level of the received PST signal and operates to remove violations of the +3, −2 property is shown in FIG. 3. Since the error detection apparatus serves also to regenerate the signals, the input of the circuit is connected to receive signals from the previous transmission link and the output of the apparatus is connected to the next transmission link so that the regenerated signals are retransmitted.

The incoming signals are applied to two rectifier circuits 10 and 11 by means of a balanced transformer 12 so that for the receipt of a positive going PST pulse a positive going pulse appears at the output terminal 15 of rectifier 10. Similarly, for each received negative going PST pulse a positive going pulse appears at the output terminal 16 of rectifier 11. The output terminal 15 of rectifier 10 is connected to one input terminal of each of two AND gates 18 and 20, while the output terminal 16 of rectifier 11 is connected to one input terminal of each of AND gates 22 and 24. The output terminals of AND gates 18 and 24 are connected to the input terminals of OR gate 27 while the output terminals of AND gates 22 and 20 are connected to the input terminals of OR gate 28. OR gates 27 and 28, respectively, serve to set and reset bistable circuit 30 whose output terminals are connected to a second input terminal of AND gates 18, 20, 22 and 24. In addition, the output signals from AND gates 20 and 24, respectively, serve to set and reset the state of bistable circuit 32 whose output terminals are connected to the input terminals of AND gates 20 and 24. Briefly stated, the function of this logic circuitry comprising AND gates 18, 20, 22 and 24, OR gates 27 and 28 and bistable circuits 30 and 32 is to cause the bistable circuits to assume predetermined states in accordance with the algebraic sum of the PST input signal.

The states of the flip-flop circuits for each allowable level of the PST signal are shown in FIG. 4, wherein the following terminology is employed:

When bistable circuit 30 is in the set state so that a reference voltage appears at its "1" output terminal and a ground voltage at its "0" output, this is denoted by an X in the column labeled 30 in FIG. 4. Similarly, when bistable circuit 30 is in the reset condition so that a reference voltage appears at its zero output terminal and ground voltage appears at its "1" output terminal, such a condition is indicated in FIG. 4 by the presence of an X′ output in the column labeled 30 in FIG. 4. The same convention holds for bistable circuit 32 with the exception that the letters Y and Y′ are designated to denote the set and reset states of bisable circuit 32. Thus, when the level of the input signal is zero, according to the table in FIG. 4, bistable circuit 30 is in the set condition and bistable circuit 32 is in the reset condition.

Assume initially that bistable circuit 30 is in the set condition and bistable circuit 32 is in the reset condition when the input signal shown in FIG. 1 is applied to transformer 12. The first PST word is +1, −1. In response to the first bit, +1, a positive going pulse appears at the output terminal 15 of rectifier 10. This pulse is applied to AND gates 18 and 20. At this time AND gate 18 is nonconductive since there is a ground voltage at the "0" output terminal of bistable circuit 30. AND gate 20, however, is enabled by the reference voltage at the "1" output terminal of bistable circuit 30 and the reference voltage at the "0" output terminal of bistable circuit 32. As a result, AND gate 20 conducts and its output signal is directly applied to set bistable circuit 32 and reset bistable circuit 30. The output signals at bistable circuits 30 and 32 now correspond to the outputs shown in FIG. 4 for the input signal having a level of +1.

The second bit of the first word of the PST signal shown in FIG. 2 is a −1 and the positive going pulse at output terminal 16 of rectifier 11 is conducted by AND gate 24 which is enabled by the signal present at the "1" output of bistable circuit 32 and the signal at the "0" output terminal of bistable circuit 30 since bistable circuit 30 is in the reset condition and bistable circuit 32 is in the set condition. The output signal from AND gate 24 is conducted by OR gate 27 to set bistable circuit 30 and reset bistable circuit 32 so that the bistable circuits return to the states indicative of a zero level.

The second word of the PST signal is −1, +1. The first bit −1 is conducted by AND gate 22, enabled by the reference voltage at the "1" output terminal of bistable circuit 30. The resulting pulse generated by AND gate 22 is transmitted through OR gate 28 to reset bistable circuit 30. No further action takes place since AND gate 24 is rendered nonconductive by the presence of a ground voltage at the "1" output terminal of bistable circuit 32. As a result, after the level of the input signal goes to −1, bistable circuits 30 and 32 are each in the reset condition.

The second bit of the second word of the PST signal is +1. This signal causes the bistable circuits to assume the conditions of the zero level since the algebraic sum of the input signal is now zero. This action is accomplished by the conduction of AND gate 18, which is enabled by the signal present at the "0" output terminal of bistable circuit 30, and whose output signal produces an output signal from OR gate 27 to set bistable circuit 30.

The third word of the PST signal is 0, +1, the "0" bit having no effect on the circuitry and the +1 bit acting in the manner previously described to cause the bistable circuit 30 to be reset. The fourth word of the transmitted PST signal is +1, −1. Since the first bit +1 causes the level of the signal to go to +2, in accordance with the table shown in FIG. 4, both bistable circuits 30 and 32 should be in the set condition. This is accomplished by the enablement of AND gate 18 by the signal at the "0" output terminal of bistable circuit 30 so that a pulse is produced by AND gate 18 and conducted by OR gate 27 whose output sets bistable circuit 30. No further action takes place in view of the fact that AND gate 20 is rendered nonconductive due to the ground voltage present at the "0" output terminal of bistable circuit 32.

The second bit of the fourth PST word shown in FIG. 1 is a −1. Since bistable circuit 30 is set, AND gate 22 is rendered conductive and the negative going pulse at terminal 16 is transmitted through OR gate 28 to reset bistable circuit 30. Thus, for the idealized PST signal shown in FIG. 1, the bistable circuits 30 and 32 assume the outputs shown in the table in FIG. 4. As has been shown above, either AND gate 18 or AND gate 20 conducts upon the occurrence of a positive going PST pulse when the algebraic sum of the PST signal is −1, 0, or +1. The resulting output signals from AND gates 18 and 20 are transmitted through OR gate 34 and regenerated by regenerator 35 whose output terminal is connected to a balanced output transformer 36. Similarly, as has been shown above, either AND gate 22 or AND gate 24 conducts upon the occurrence of a negative going PST signal when the algebraic sum is 0, +1, or +2. The resulting signals are applied to OR gate 38, regenerated by regenerator 39 and applied to transformer 36. Thus, the PST signal in the absence of any error is reproduced at the output terminal connected to transformer 36.

In accordance with this invention, when an error, such as that shown in FIG. 2 occurs, the circuitry functions to both record and remove the resulting violation of the +3, −2 property so that subsequent error detectors will not record any errors save those introduced by subsequent transmission errors. Thus, the error in the transmission of the second PST word shown in FIG. 2, which caused a failure to transmit a −1 in the first bit of the second word, causes the regenerated signal to assume a level of 0 at the end of the first bit of the second word. Subsequently, at the beginning of the fourth word, the level of the regenerated signal is +2 when it should be, as shown in the dotted line, at +1. As a result, the +1 in the first bit of the fourth word results in a level of +3, which is a violation of the +3, −2 property. At this juncture, in accordance with this invention, a violation is recorded by a violation counter 40 operating under the control of an AND gate 41. AND gate 41 is enabled whenever bistable circuits 30 and 32 are in their set condition indicating that the level of the signal is +2. At such time a positive PST pulse appearing at terminal 15 will actuate AND gate 41 to produce an output signal which is applied to violation counter 40 by means of OR gate 42. As a result, a violation is counted. In addition, when both bistable circuits 30 and 32 are in their set condition neither AND gate 18 nor AND gate 20 is enabled so that the positive PST pulse, which causes the algebraic sum to go to +3, is not regenerated. The result is that the level of the PST signal is maintained at +2 units during the time slot corresponding to the first bit of the fourth word of the PST signal so that the level of the PST signal is returned to the level of the ideal pulse train. This is shown graphically in FIG. 2 by the convergence of the the solid and dotted curves at the beginning of the second bit of the fourth word of the PST signal.

Similarly, when the direct current level of the PST signal is −1, both bistable circuits 30 and 32 are in the reset condition and if another negative pulse should occur then AND gate 43 will generate an output signal which is transmitted to the violation counter 40 by means of OR gate 42. Thus, whenever the direct current level of the PST signal would go more negative than −1 units, due to a transmission error, a violation is counted. In addition, neither AND gate 22 nor AND gate 24 is conductive under such a set of circumstances, so that a negative pulse appearing at terminal 16, when the DC level is −1, will not be regenerated.

Thus, in accordance with this invention, the level of the PST signal is monitored, violations of the +3, −2 property counted, and the signal regenerated with violations of the +3, −2 property removed. To accomplish this removal of the violation, it was necessary to introduce a compensating error, thus doubling the error rate. This doubling of the error rate has been found to be of no great consequence in high speed PCM systems. In addition, when starting operation, the setting of the flip-flops may not correspond to the instantaneous level of the PST pulse train. In this case, a number of violations are recorded which correspond to the difference between the level of the PST signal and the initial level of the bistable circuits. Within a short period of time, however, due to the violation removal properties of the above-described circuitry, the bistable circuits assume the proper level of the PST pulse train.

A second property of the PST signal is that the levels +2 and −1 must be followed immediately by the +1 and 0 levels, respectively. Thus, as shown in FIG. 1, at the end of the first bit of the second word, for example, the level of the PST signal is −1 and the next bit is a +1 so that the level immediately returns to 0. Similarly, at the end of the fourth PST word the level is +2 but it immediately returns to +1 due to the negative pulse occurring during the second bit of the fourth word.

Four violations of the so-called +2, −1 property are possible. First, when the direct current level of the PST signal is at +2 units, a positive pulse might occur. Or, when the level is at +2 units, a space might occur. Either of these two signals, when the direct current level is at +2 units, signifies an error since the +2 level should be immediately followed by the +1 level. Similarly, in symmetrical fashion, either a space or a negative PST pulse occurring when the amplitude level is at −1 units, signifies an error since the −1 level should be followed immediately by the 0 level which requires the occurrence of a positive pulse in the next bit of the PST signal.

Figure 5:
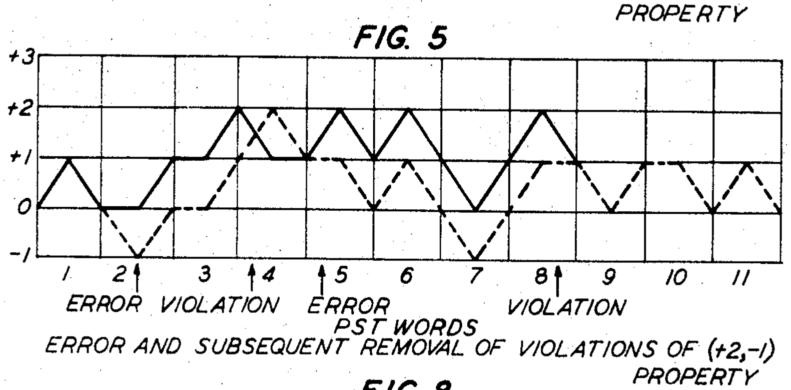
FIG. 5 illustrates the manner in which an error results in violations of the +2, −1 property.

In FIG. 5, the ideal PST signal without error is shown in the dotted curve while the received signal due to transmission errors is shown in the solid line when it deviates from the ideal signal. Two violations of the +2 level due to transmission errors are illustrated. The first violation is the occurrence of a positive pulse in the first bit of the fourth word which would raise the amplitude level to +3 units. A second violation is shown in the second bit of the eighth PST word where a space occurs at the +2 level. As discussed above, the only signal which does not constitute a violation when the amplitude level is at +2 units is a negative PST pulse since the +2 amplitude level must be immediately followed by the +1 amplitude level. Similarly, a violation occurs at the −1 level when either a −1 or a 0 follows an amplitude level of −1 units.

Figure 6:
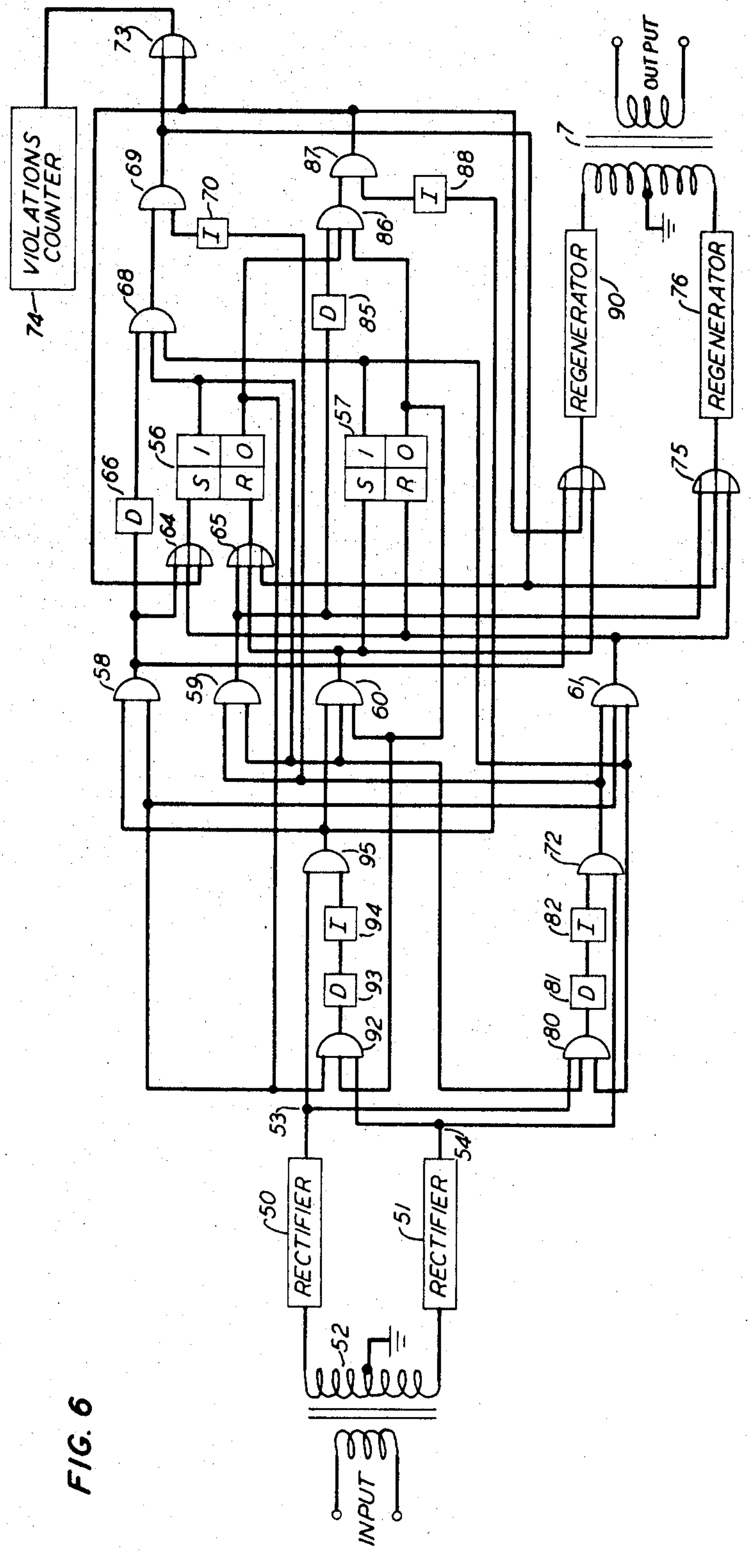
FIG. 6 is an illustrative embodiment of the invention which detects errors of the +2, −1 property.

An error detection and violation removal circuit which examines the amplitude level of the received PST signal and in accordance with this invention operates to remove the violations of the +2, −1 property is shown in FIG. 6. The incoming signals are applied to two rectifier circuits 50 and 51 by means of a balanced transformer 52 so that for the receipt of a positive going PST pulse a positive pulse appears at the output terminal 53 of rectifier 50, and for each received negative going PST pulse a positive pulse appears at the output terminal 54 of rectifier 51. Two bistable circuits 56 and 57 are provided which operate in conjunction with logic circuitry comprising AND gates 58, 59, 60 and 61 and OR gates 64 and 65 to have predetermined states in accordance with the table shown in FIG. 4. That is to say, bistable circuits 56 and 57 correspond to bistable circuits 30 and 32, respectively, shown in FIG. 3, and the circuitry comprising AND gates 58, 59, 60, 61, OR gates 64 and 65 corresponds to AND gates 18, 22, 20, 24 and OR gates 27 and 28.

The only addition to the above-described logic circuitary, as compared to that shown in FIG. 3, is that OR gates 64 and 65 each have an additional input terminal so that bistable circuit 56 may be set and reset by an additional signal. Bistable circuit 56 is reset by this additional signal upon the occurrence of a violation in the +2 property, namely the failure of the level +1 to immediately follow the level +2. That is to say, bistable circuit 56 in the following time slot is reset when the level of the input signal is at +2.

As shown in FIG. 5, such a violation may occur in either of two ways. As a result of the error in the second word of the PST signal, a violation of the +2 property occurs during the first bit of the fourth word of the PST signal. The ideal signal is shown in a dotted line while the received signal is shown in the solid line. At the beginning of the first bit of the fourth PST word, the level of the received signal is +2 which means that a negative pulse should be received during the first bit of the fourth word. Due to the error in transmission in the second PST word a positive pulse is actually received. This, of course, represents a violation. Similarly, at the beginning of the second bit of the eighth word the level is +2 and a negative pulse should occur. Due to an error during the first bit of the fifth word of the PST signal, a space is transmitted during that time slot and this, of course, represents the second possible type of violation of the +2 property. It should be apparent to those skilled in the art that two similar violations can occur in the −1 property of the PST signal, namely the failure of the level 0 to immediately follow the level −1.

Whenever the level of the PST signal is raised to +2, a positive pulse appears at the output terminal of AND gate 58 which is delayed one time slot by delay circuit 66 and applied to AND gate 68. AND gate 68 is enabled whenever both bistable circuits are in the set condition so that whenever the level of the PST signal rises to +2, AND gate 68 will be enabled one time slot later. The output terminal of AND gate 68 is applied to AND gate 69 which is connected to receive the output signal from an inverter circuit 70. As is well known, an inverter circuit, such as that shown on page 401 of "Pulse and Digital Circuits" by Millman & Taub, published by McGraw-Hill Book Company, 1956, serves to invert the polarity of a pulse. Inverter 70 generates an output signal, except upon the reception of a negative PST pulse during the bit interval immediately following the positive pulse which raised the direct current level to +2. A signal indicative of the presence of a negative pulse at such time is derived from rectifier 51 whose output terminal 54 is connected to an AND gate 72 which is normally rendered conductive, except upon the occurrence of a positive pulse immediately succeeding the positive pulse which sets the PST level to +2, and whose output is connected to the input of inverter circuit 70. As a result, whenever a signal, other than a negative PST pulse occurs following a positive PST pulse which sets the level to +2, AND gate 69 produces an output signal which is applied through an OR gate 73 to a violation counter 74, indicating that a violation has occurred. This sequence of events takes place whether a positive pulse occurs after the level +2 has been reached, or a zero occurs after the level +2 has been reached, since either such event constitutes a violation. In addition, whenever an error in the +2 property occurs, the output signal from AND gate 69 is applied to OR gate 65 to reset bistable circuit 56 such that the level indicated by bistable circuits 56 and 57 is +1. To eliminate the violation of the +2 property, the output signal from AND gate 69 is applied to one input terminal of a three input terminal OR gate 75 whose output terminal is connected to a regenerator circuit 76. OR gate 75 and regenerator circuit 76 correspond to OR gate 38 and regenerator circuit 39 in FIG. 3 with the exception of the fact that OR gate 75 has three input terminals whereas OR gate 38 has only two input terminals. Two of the three input terminals of OR gate 75 are connected to receive the same signals as received by OR gate 38 in FIG. 3, but the third input terminal receives the output of AND gate 69 upon the presence of a violation of the+2 property. As a result, regenerator circuit 76, whose output is connected to a balanced output transformer 78, produces a negative output pulse whenever a violation of the +2 property would have occurred. Thus, the first bit of the fourth word regenerated by the circuitry is a −1, whereas it would have been a +1 if the input signal were regenerated without regard to violations. A similar result is present during the second bit of the eighth word in which the amplitude level is reduced to +1 by the generation at the output terminal of a negative pulse.

As above described, whenever the +2 level is not followed immediately by the +1 level, the bistable circuits 56 and 57 are placed in their proper states, as shown in FIG. 4, to indicate the level +1. For a violation, such as shown in the eighth word of the PST signal in FIG. 5, the result of the generation of a negative PST bit, upon detection of a violation and the resetting of the flip-flops to the +1 level, results in the convergence of the levels of the ideal PST signal and that which is actually received.

In the case of a violation because of the reception of a positive pulse when the amplitude level of the signal is at +2, as shown during the first bit of the fourth word of FIG. 4, the generation at the output terminal of a negative pulse and the establishment of the bistable circuits 56 and 57 at the +1 level, results in the levels of the ideal and received signals being one unit of amplitude apart. Namely, the level of the regenerated signal is at the +1 level one bit after the violation is detected, whereas it should have been at the +2 level. When the ideal PST signal is at the +2 level, a negative pulse occurs. To bring the levels of the ideal PST signal and the received signals together, this normally occurring negative pulse is impeded. In this situation the violation and the failure of the levels of the ideal and regenerated signals to converge have resulted from a positive PST pulse being received after the amplitude level is at +2. The second occurring pulse, which constitutes the violation, is applied to AND gate 80 which is enabled when the level is already at +2. As a result, the positive going PST pulse, which constitutes the violation, produces an output signal from AND gate 80, which is delayed one bit by delay circuit 81, and inverted by inverter circuit 82 to inhibit the output signal from AND gate 72. Since AND gate 61 does not produce an output signal, regenerator 76 does not generate a negative pulse. This results in the generation of a space immediately following the negative pulse generated to eliminate the violation. The result, as shown during the fourth word of FIG. 5, is that the level of the ideal PST signal and the regenerated signal converge. To accomplish this, however, it has been necessary to insert two errors in the PST signal. The first is the generation of a negative pulse during the first bit of the fourth word of the PST signal when a positive pulse should have been generated. The second is the generation of a space during the second bit of the fourth PST word when a negative pulse should have been generated. This results in a tripling of the error rate for this type of violation. The error rate for violations, as a result of the generation of a negative pulse instead of a space when the level is at +2, is merely doubled.

For detecting violations of the −1 property, namely, those which result in a failure of the level 0 to immediately follow −1, similar apparatus is provided. Delay circuit 85, AND gates 86, 87 and inverter circuit 88 produce an output signal whenever there is a violation of the −1 property. This circuitry corresponds to the logic circuitry comprising delay circuits 66, AND gates 68 and 69 and inverter circuit 70, but functions to produce an output signal whenever a violation of the −1 property occurs. The resulting output signal from AND gate 87 is used to set bistable circuit 56 so that the level indicated by the bistable circuits is zero after a violation is detected, and it functions also to cause regenerator circuit 90 to produce a positive going output pulse upon detection of such a violation. In the situation, where the violation is the result of a reception of a space when the level is as −1, which situation corresponds to that shown for the violation of the +2 property in the eighth word of FIG. 5, the result is that the levels of the ideal and regenerated signals immediately converge. Where the violation of the +1 property is a result of the reception of a negative pulse when the level is at −1, the generation of a positive going pulse while eliminating the violation does not cause the level of the ideal and regenerated signals to converge. This situation corresponds to that shown during the fourth word shown in FIG. 5. Circuitry comprising AND gate 92, delay circuit 93, inverter circuit 94 and AND gate 95, which corresponds to the logic circuitry comprising AND gate 80, delay circuit 81, inverter circuit 82 and AND gate 72, functions to suppress the next positive going pulse which should normally occur. As a result, by the insertion of two additional errors following such a violation of the −1 property, the levels of the ideal and regenerated signals are caused to converge.

By reference to FIG. 1, it may be observed that the amplitude level of the PST signal at the end of a PST word should either be +1 or 0, with no other levels occuring at the end of the word. This is the so-called +1, 0 property. An error detector and violation removal circuit which examines the amplitude level of the received PST signal and operates to remove violations of the +1, 0 property is shown in FIG. 7.

Figure 7:
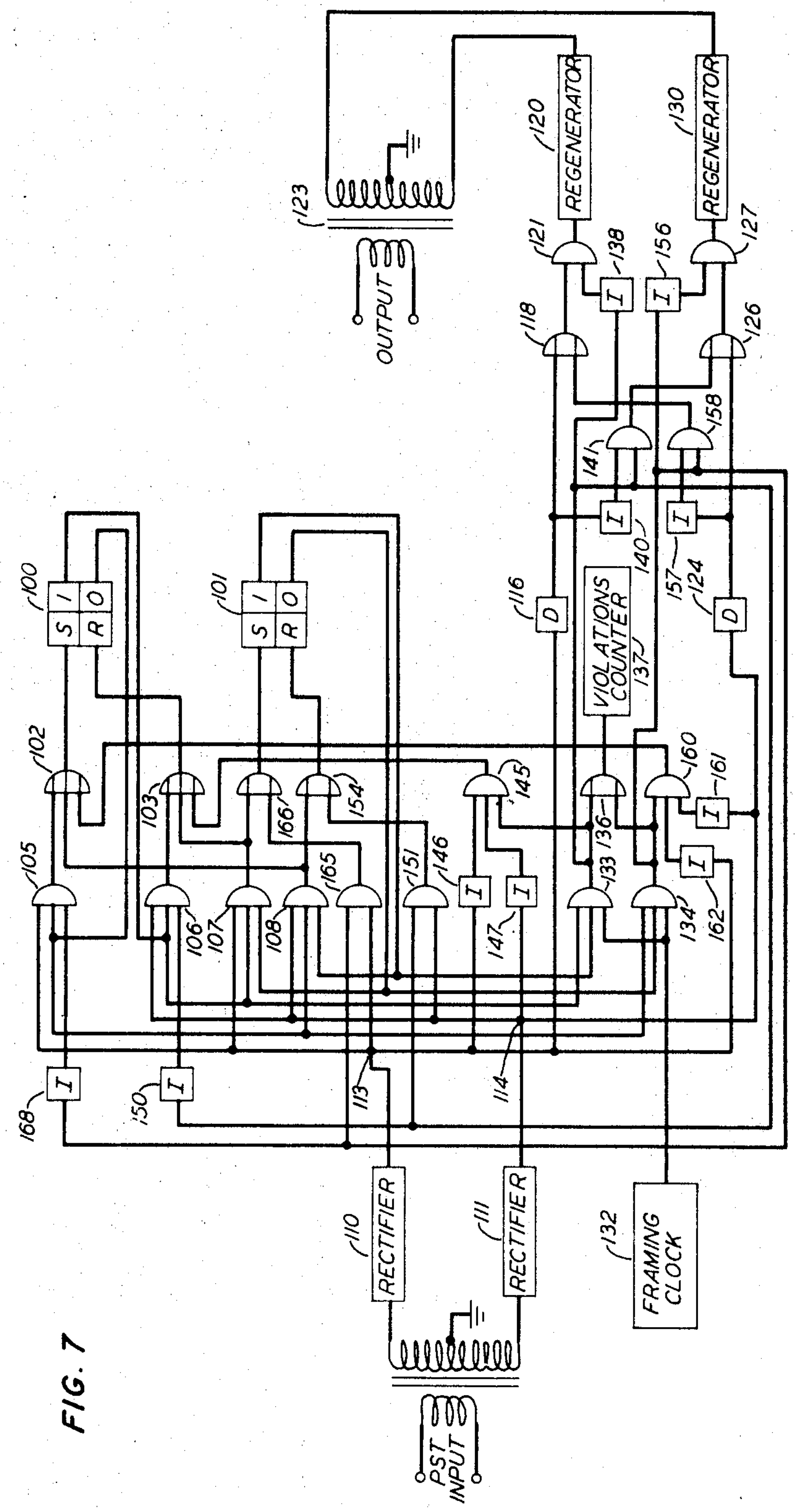
FIG. 7 is an illustrative embodiment of the invention which detects errors in the +1, 0 property.

In accordance with this invention, the apparatus shown in FIG. 7 examines the levels at the end of each word to determine whether they are either +1 or 0, and if they are not, a violation is recorded and the violation is removed from the regenerated signal by suitably altering the signal which occurred in the time slot immediately preceding the end of the word where a violation was recorded. To accomplish this purpose, a pair of bistable circuits 100 and 101 together with OR gates 102 and 103 and AND gates 105, 106, 107 and 108 operate in the same manner as previously described with relation to bistable circuits 30 and 32, OR gates 27 and 28, and AND gates 18, 20, 22 and 24. Thus, bistable circuits 100 and 101 function to produce predetermined output signals in accordance with the level of the PST signal as shown in FIG. 4.

Normally, in the absence of violations of the +1, 0 property, incoming PST pulses are rectified by rectifiers 110 and 111 so that a positive pulse appears at terminal 113 whenever a positive PST pulse is received and a positive pulse appears at terminal 114 whenever a negative PST pulse is received. Positive pulses at terminal 113 are delayed one time slot by a delay circuit 116, transmitted through OR gate 118 and then to regenerator 120 through normally conducting AND gate 121. The output of regenerator 120 is connected to a balanced output transformer 123 so that in the absence of errors positive PST pulses are regenerated. Similarly, each rectified negative PST pulse at terminal 114 is delayed one time slot by delay circuit 124 and transmitted through OR gate 126 and AND gate 127 to regenerator 130, whose output is connected to the balanced output transformer 123. In the absence of errors, AND gate 127 is normally conductive so that each negative going PST pulse is regenerated when no violation has been recorded.

A framing clock generator 132 such as described in the above mentioned copending application is present at each repeater point employing the apparatus of FIG. 7 and produces a pulse at the beginning of each PST word. This pulse is applied to AND gates 133 and 134, whose purpose is to generate an output signal indicative of a violation of the +1, 0 property. AND gate 133 functions to recognize violations of the +1 portion of this property. That is to say, it generates a violation signal when the level of the received signal is +2 at the end of a word. Toward this end AND gate 133 has two additional input terminals, one of which is connected to the "1" output terminal of bistable circuit 101 and the second of which is connected to the "1" output terminal of bistable circuit 100. As a result, if at the beginning of any PST word the amplitude level of the PST signal is at +2, AND gate 133 will produce an output signal indicative of the fact that an error has occurred since the amplitude level of the received signal is at neither +1 nor 0.

The output signal from AND gate 133 is transmitted by OR gate 136 to a violation counter 137 which records this violation of the +1, 0 property. In addition, the output signal from AND gate 133 is used to inhibit AND gate 121 since it is applied to one input terminal of AND gate 121 by means of an inverter circuit 138 which produces a ground voltage upon the occurrence of a violation of the +1 property to inhibit AND gate 121. As a result, if the violation of the +1 property is due to a positive pulse in the time slot immediately preceding the occurrence of the violation, that positive pulse delayed by delay circuit 116 is inhibited and a space is generated instead of the positive pulse. If the signal in the time slot immediately preceding the recording of the violation was a space, then inverter circuit 140 will produce a reference voltage one time slot later which, together with the output signal from AND gate 133 occurring at the beginning of the next PST word, serve to enable AND gate 141 with the result that OR gate 126 produces an output signal regenerated as a negative pulse.

Thus, in the presence of a violation of the +1 property, two possible signals may be regenerated. If the violation was due to a positive pulse in the time slot preceding the violation, that positive pulse is not regenerated and a space is transmitted. If the signal in the preceding time slot was a space, then a negative pulse is created and transmitted in its place. It should be noted that it is not possible to have a negative PST pulse in the time slot immediately preceding the recording of a violation since this would mean that a violation would have been recorded at the end of the preceding word. As a result, the violations are removed from the signal retransmitted over the transmission medium but, of course, an additional error has been inserted for each violation removed.

Of course, when a violation is detected and the signal altered, as explained above to remove the violation, it is necessary to reset the levels of the bistable circuits 100 and 101 so that they correspond to the level of the signal with the violation removed.

Figure 8:
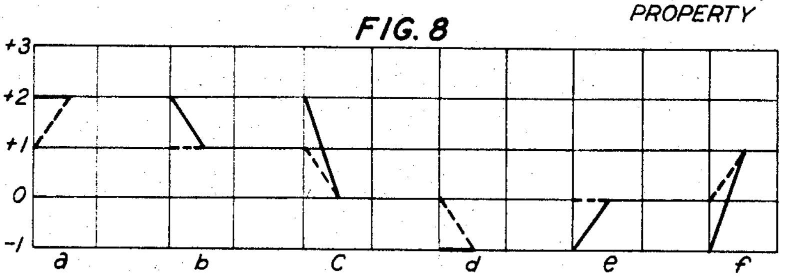
FIG. 8 is a waveform illustrating the manner in which the levels indicated by the bistable circuits in the embodiment of the invention shown in FIG. 6 are caused to converge with those of the ideal PST signal.

FIG. 8 illustrates the three possible examples of violations of the +1 property, that is, the property that the level is greater than +1 at the end of a word. Depending upon the signal which occurs during the first time slot of the word following the detection of a violation, the states of the flip-flop circuits are either retained at the +2 level or reset to such a level that after the first bit of the PST word following the violation, the level of the bistable circuits corresponds to the level of the ideal signal.

In the first example shown in FIG. 8 during word *a*, the signal immediately following the detection of a violation of the +1 property is a positive going pulse as indicated by the dotted sloping line. Since the bistable circuits are in states indicating that the level is +2 at the time of the violation, they are retained in these states so that at the end of the first time slot of the PST word following the violation the states of the bistable circuits correspond to the amplitude level of the signal. This result is accomplished due to the fact that neither AND gate 105 nor AND gate 107 is in a conductive condition when the level is at +2 upon detection of the violation. As a result, neither of these AND gates 105 nor 107 conducts the positive pulse present at terminal 113 so that the states of the bistable circuits are retained at the +2 level.

The second possible occurrence following the detection of a +1 violation is that a space occurs in the first time slot of the word succeeding the detection of the violation. In order for the bistable circuits 100 and 101 to assume states such that the level indicated by the bistable circuits and the ideal signal are the same at the end of the first time slot of the word following the detection of the violation, the state of the bistable circuits must be changed so that they indicate a level of +1. As shown in the table in FIG. 4 the bistable circuits indicate a level of +1 when bistable circuit 100, which corresponds to bistable circuit 30, is reset; and bistable circuit 101, which corresponds to bistable circuit 32 in FIG. 3, is set. Since both bistable circuits 100 and 101 are initially in the set condition, this necessitates resetting of bistable circuit 100.

The signal to reset bistable circuit 100 is derived from AND gate 133 via AND gate 145 which is connected to receive inverted input signals from terminals 113 and 114 by means of inverter circuits 146 and 147. Inverter circuits 146 and 147 each produce an enabling voltage for AND gate 145 provided that neither a positive pulse nor a negative pulse occurs in the first time slot of the word immediately following the detection of the violation. This corresponds, of course, to the condition in this example wherein a space follows the violation. The signal generated by AND gate 145 is applied to OR gate 103 whose output signal is applied to bistable circuit 100 to reset it.

The third possible pulse signal following a violation is a negative pulse shown in word *c* in FIG. 8. The occurrence of such a negative pulse, of course, reduces the level of the PST signal to zero. As a result, as shown in FIG. 4, bistable circuit 101, which corresponds to bistable circuit 32 shown in FIG. 3, should be reset. Normally, this negative pulse would be conducted by AND gate 106, which corresponds to AND gate 22 in FIG. 3, to bistable circuit 100 but the output signal from AND gate 133 is applied by means of an inverter circuit 150 to one input terminal of AND gate 106. As a result, AND gate 106 is impeded so that bistable circuit 100 is retained in the set condition. At the same time the negative pulse is applied to AND gate 151 which is enabled by the output signal from AND gate 133. The output signal from AND gate 151 is applied to one input terminal of an OR gate 154 whose second input terminal is connected to the output terminal of AND gate 108; OR gate 154 conducts upon the occurrence of a negative input pulse following the detection of a violation of the +1 property, and the output signal from OR gate 154 is applied to bistable circuit 101 to reset that bistable circuit. As a result, bistable circuits 100 and 101 are in the set and reset conditions corresponding to the zero level.

At the end of each word the level of the input signal should, as discussed above, be at either +1 or 0. The apparatus discussed in detail above removes the violations in the input or received signal when the amplitude level of the PST signal violates the +1 property. The three possible signals following the occurrence of such a violation are shown in words *a, b* and *c* in FIG. 8.

Apparatus is provided in the circuitry shown in FIG. 7 to remove the violations of the received signal which result from the fact that the level of the signal is at the level −1 rather than 0 at the end of a PST word. These violations are removed in the following manner. When the level of the received signal is at −1, the signal in the preceding time slot of the PST singal may have been either a −1 or a space. Obviously, the signal could not have been a positive pulse for if it were then a violation would have been detected at the end of the preceding PST word. When the signal immediately preceding the detection of a violation is a negative pulse, the violation is removed by suppressing the negative pulse and transmitting a space in the preceding time slot. Toward this end, AND gate 134 is provided with three input terminals, the first of which is connected to the "0" output terminal of bistable circuit 100, and the second of which is connected to the "0" output terminal of bistable circuit 101. As a result, when both bistable circuits 100 and 101 are in their reset condition, AND gate 134 is enabled and a framing signal from framing clock generator 132 produces an output signal from AND gate 134 indicative of the fact that a violation has occurred. The output signal from AND gate 134 is used to inhibit the regeneration of a negative pulse by being applied to an inverter circuit 156 whose output terminal is connected to AND gate 127. As a result, the received negative pulse applied to AND gate 127 through delay circuit 124 and OR gate 126 is not regenerated, so that if the violation of the zero property is due to a negative received pulse in the time slot immediately preceding the occurrence of the violation, that negative pulse is suppressed and a space is generated.

If the signal in the time slot immediately preceding the recording of a violation is not a negative pulse, then inverter circuit 157, connected to receive the delayed input signal at the output of delay circuit 124, produces a reference voltage which, together with the output signal from AND gate 134, produces an output signal from AND gate 158. The output signal from AND gate 158, which is indicative of the fact that a space preceded the recording of the violation, is transmitted through OR gate 118, AND gate 121 to regenerator 120 where it causes the generation of a positive pulse. Thus, in the presence of a violation of the zero property, two possible signals may be regenerated. If the violation was due to a negative pulse in the preceding bit, that negative pulse is suppressed and a space is transmitted. If the signal in the preceding bit was a space, then a positive pulse is created and transmitted in its place.

Of course, it is necessary to reset the bistable circuits under two conditions as was the case with the violations of the +1 property shown in words *b* and *c* of FIG. 8. When a space occurs in the first time slot of the word following the detection of a violation, as shown in word *e* of FIG. 8, AND gate 160 is enabled by the output signals from inverter circuits 161 and 162. As a result, the output signal from AND gate 134, indicative that an error of the zero property has taken place, is applied to OR gate 102 to set bistable circuit 100 so that the states of the bistable circuit 100 and 101 indicate a level of zero. As a result, the levels of the ideal signal and the received signal are made identical.

When the received signal in the bit immediately following the detection of the violation is a positive pulse, the PST signal should be set to the level +1 so that the amplitude level of the ideal signal and the amplitude level indicated by the bistable circuits are identical. This situation is shown in word *f* where the solid line indicates the level of the bistable circuits and the dotted line that of the ideal signal. This is accomplished by applying the output signal from AND gate 134 to AND gate 165 which is also connected to receive a positive PST pulse at terminal 113. As a result, under these conditions AND gate 165 conducts and produces an output signal which is transmitted through OR gate 166 to set bistable circuit 101. To prevent bistable circuit 100 from being set due to the reception of the positive going PST pulse, the output signal from AND gate 134 is also applied to inverter circuit 168 whose output signal disables AND gate 105. As a result, bistable circuits 100 and 101 are in the set and reset conditions, respectively.

Finally, as shown in word *d* of FIG. 8, when a negative pulse follows the detection of a violation, there is no need to change the level indicated by the bistable circuits.

Thus, in accordance with this invention, the amplitude level of the signal is monitored and errors detected because they cause violations of certain predetermined properties of the signal. The violations are recorded and in addition removed from the regenerated signal so that an error detector located further along the transmission system will not record violations due to errors occurring in the transmission system prior to reception of the transmitted signal by the first error detector. As a result, it is possible to ascertain which section of the transmission system is responsible for the creation of transmission errors, and suitable measures can be taken to correct the situation.

It is to be understood that the above-described embodiments are illustrative of the application of the invention. Numerous other arrangements may be devised by those skilled in the art without departing from the spirit and scope of the invention.

What is claimed is:

1. In a pulse communication system wherein a train of unipolar pulses and spaces is converted into three state signals of positive pulses, negative pulses, and spaces so that the number of consecutive spaces is not more than two by first dividing the unipolar pulse signals into two bit binary words and then encoding these binary words in accordance with the following codes

| | Code No. 1 | Code No. 2 |
|---|---|---|
| 11 | +1, −1 | +1, −1 |
| 10 | +1, 0 | −1, 0 |
| 01 | 0, +1 | 0, −1 |
| 00 | −1, +1 | −1, +1 |

said encoding being done in accordance with code number 1 until a three state signal the algebraic sum of the amplitude of whose bits is +1 is generated whereupon said encoding is accomplished in accordance with code number 2 until a three state signal the algebraic sum of the amplitude of whose bits is −1 is generated and said conversion again accomplished in accordance with code number 1, apparatus for receiving an input train of pulses and spaces encoded in accordance with said code for detecting and removing violations therein comprising, a pair of bistable circuits, first gating means connected to receive said input pulse train the output terminals of said gating means being connected to the input terminals of said bistable circuits so that said bistable circuits produce output signals which are indicative of the algebraic sum of the input pulse train, a second gating means responsive to said bistable circuits output signals to generate a signal whenever the algebraic sum of the input pulse train violates predetermined criteria, counting means connected to said second gating means to record the rate at which said input pulse train exceeds said predetermined criteria, means connecting the outputs of said bistable circuits to said first gating means and regenerator means connected to the output of said first gating means to reproduce said input pulse train without a single violation.

2. In a pulse communication system wherein a train of unipolar pulses and spaces is converted into three state signals of positive pulses, negative pulses, and spaces so that the number of consecutive spaces is not more than two by first dividing the unipolar pulse signals into two bit binary words and then encoding these binary words in accordance with the following codes

| | Code No. 1 | Code No. 2 |
|---|---|---|
| 11 | +1, −1 | +1, −1 |
| 10 | +1, 0 | −1, 0 |
| 01 | 0, +1 | 0, −1 |
| 00 | −1, +1 | −1, +1 |

said encoding being done in accordance with code number 1 until a three state signal the algebraic sum of the amplitude of whose bits is +1 is generated whereupon said encoding is accomplished in accordance with code number 2 until a three state signal the algebraic sum of the amplitude of whose bits is −1 is generated and said conversion again accomplished in accordance with code number 1, apparatus for receiving an input train of pulses and spaces encoded in accordance with said code for detecting and removing violations therein comprising, a pair of bistable circuits, first gating means connected to receive said input pulse train the output terminals of said gating means being connected to the input terminals of said bistable circuits so that said bistable circuits produce output signals which are indicative of the algebraic sum of the input pulse train, second gating means responsive to the output signals of said bistable circuits to generate a violation signal whenever the algebraic sum of the input pulse train is greater than +2 units in the positive direction or −1 unit in the negative direction, counting means connected to said second gating means to record the rate at which the algebraic sum of the input pulse train exceeds +2 units in the positive direction of −1 unit in the negative direction, means connecting the outputs of said bistable circuits to said first gating means and regenerator means connected to the output of said first gating means to reproduce said input pulse train without a single violation.

3. In a pulse communication system wherein a train of unipolar pulses and spaces is converted into three state signals of positive pulses, negative pulses, and spaces so that the number of consecutive spaces is not more than two by first dividing the unipolar pulse signals into two bit binary words and then encoding these binary words in accordance with the following codes

| | Code No. 1 | Code No. 2 |
|---|---|---|
| 11 | +1, −1 | +1, −1 |
| 10 | +1, 0 | −1, 0 |
| 01 | 0, +1 | 0, −1 |
| 00 | −1, +1 | −1, +1 |

said encoding being done in accordance with code number 1 until a three state signal the algebraic sum of the amplitude of whose bits is +1 is generated whereupon said encoding is accomplished in accordance with code number 2 until a three state signal the algebraic sum of the amplitude of whose bits is −1 is generated and said conversion again accomplished in accordance with code number 1, apparatus for receiving an input train of pulses and spaces encoded in accordance with said code for detecting and removing violations therein comprising, a pair of bistable circuits, first gating means connected to receive said input pulse train the output terminals of said gating means being connected to the input terminals of said bistable circuits so that said bistable circuits produce output signals which are indicative of the algebraic sum of the input pulse train, second gating means connected to the output terminals of said bistable circuits and to receive said input signals to generate a violation signal whenever a positive pulse or a space is received at a time when the algebraic sum of the input signal as indicated by the states of the bistable circuits is +2, third gating means connected to the output terminals of said bistable circuits to generate a violation signal whenever a negative pulse or a space is received at a time when the algebraic sum of the input signal as indicated by the states of the bistable circuits is −1, counting means connected to said second and said third gating means to record the rate at which said violation signals are generated, and regenerator means connected to the outputs of said first, second and third gating means to reproduce said input pulse train without a single violation.

4. In a pulse communication system wherein a train of unipolar pulses and spaces is converted into three state signals of positive pulses, negative pulses, and spaces so that the number of consecutive spaces is not more than two by first dividing the unipolar pulse signals into two bit binary words and then encoding these binary words in accordance with the following code

| | Code No. 1 | Code No. 2 |
|---|---|---|
| 11 | +1, −1 | +1, −1 |
| 10 | +1, 0 | −1, 0 |
| 01 | 0, +1 | 0, −1 |
| 00 | −1, +1 | −1, +1 |

said encoding being done in accordance with code number 1 until a three state signal the algebraic sum of the amplitude of whose bits is +1 is generated whereupon said encoding is accomplished in accordance with code number 2 until a three state signal the algebraic sum of the amplitude of whose bits is −1 is generated and said conversion again accomplished in accordance with code number 1, apparatus for receiving an input train of pulses and spaces encoded in accordance with said code for detect and removing violations therein comprising, a pair of bistable circuits, first gating means connected to the input terminals of said bistable circuits so that said bistable circuits produce output signals which are indicative of the algebraic sum of the input pulse train, second gating means connected to receive said input signals to generate a violation signal when either a positive pulse or a space is received at a time at which the algebraic sum of the input signal as indicated by the states of the bistable circuits is at +2, counting means connected to receive said violation signals generated by said second gating means to record said violations, third gating means to generate a violation signal upon the reception of either a negative going pulse or a space at a time when the algebraic sum of the input signal as indicated by the states of the bistable circuits is −1, means connecting the output of said third gating means to said counting means to count the violation signals generated by said third gating means, a regenerator circuit, fourth gating means connected between said second gating means and said regenerator circuit to cause said regenerator circuit to generate a negative pulse when a violation signal is generated by said second gating means, a second regenerator circuit, fifth gating means connected between said third gating means and said second regenerator circuit to generate a positive pulse when said third gating means generates a violation signal, means to set the states of said bistable circuits to the +1 level when said second gating means generates a violation signal, means to set the states of said bistable circuits to the zero level when said third gating means generates a violation signal, means to inhibit the regeneration of a negative pulse by said first regenerator circuit in the second time slot of the pulse train immediately following the detection of a violation by said second gating means and the reception of a positive pulse in the first time slot following said violation, and means to inhibit the regeneration of a positive pulse by said second regenerator circuit in the second time slot of the pulse train immediately following the detection of a violation by said third gating means and the reception of a negative pulse in the first time slot following said violation.

5. In a pulse communication system wherein a train of unipolar pulses and spaces is converted into three state signal words of positive pulses, negative pulses, and spaces so that the number of consecutive spaces is not more than two by first dividing the unipolar pulse signals into two bit binary words and then encoding these binary words in accordance with the following code

| | Code No. 1 | Code No. 2 |
|---|---|---|
| 11 | +1, −1 | +1, −1 |
| 10 | +1, 0 | −1, 0 |
| 01 | 0, +1 | 0, −1 |
| 00 | −1, +1 | −1, +1 |

said encoding being done in accordance with code number 1 until a three state signal word the algebraic sum of the amplitude of whose bits is +1 is generated whereupon said encoding is accomplished in accordance with code number 2 until a three state signal word the algebraic sum of the amplitude of whose bits is −1 is generated and said conversion again accomplished in accordance with said code number 1, apparatus for receiving an input train of pulses and spaces encoded in accordance with said code for detecting and removing violations therein comprising, a pair of bistable circuits, first gating means connected to receive said input pulse train the output terminals of said gating means being connected to the input terminals of said bistable circuits so that said bistable circuits produce output signals which are indicative of the algebraic sum of the input pulse train, second gating means responsive to said bistable circuits output signals to generate a violation signal whenever the algebraic sum of the input pulse train is more positive than +1 at the conclusion of a received word, third gating means to generate a violation signal whenever the algebraic sum of the input signal is negative at the conclusion of a received word, regenerator means to regenerate said input signal, and means connected to said regenerator means and said second and third gating means to remove violations in the input signal by causing said regenerator means to generate a space in the time slot of the input signal immediately preceding the detection of a violation when a pulse was transmitted during said time slot and to generate a pulse of polarity such as to remove said violation when a space was transmitted in the preceding time slot.

6. In a pulse communication system wherein a train of unipolar pulses and spaces is converted into three state signals of positive pulses, negative pulses, and spaces so that the number of consecutive spaces is not more than two by first dividing the unipolar pulse signals into two bit binary words and then encoding these binary words in accordance with the following codes

| | Code No. 1 | Code No. 2 |
|---|---|---|
| 11 | +1, −1 | +1, −1 |
| 10 | +1, 0 | −1, 0 |
| 01 | 0, +1 | 0, −1 |
| 00 | −1, +1 | −1, +1 |

said encoding being done in accordance with the code number 1 until a three state signal the algebraic sum of the amplitude of whose bits is +1 is generated whereupon said encoding is accomplished in accordance with code number 2 until a three state signal the algebraic sum of the amplitude of whose bits is −1 is generated and said conversion again accomplished in accordance with code number 1, apparatus for receiving an input train of pulses and spaces encoded in accordance with said code for detecting and removing violations therein comprising, an input transformer having a balanced output winding with a center tap and two output terminals, a first rectifier connected to a first output terminal of said output winding of said transformer, a second rectifier connected to a second output terminal of said output winding of said transformer, a first and a second bistable circuit each having "set" and "reset" input terminals and "1" and "0" output terminals, logic circuitry to cause said bistable circuits to produce output signals which are indicative of the algebraic sum of the input pulse train comprising, four AND gates, a first pair of said AND gates being connected to receive signals from said first rectifier and a second pair being connected to receive signals from said second rectifier, means connecting the "1" output terminal of said first bistable circuit to the input of a first AND gate of said first pair of AND gates and to the input terminal of a first AND gate of said second pair of AND gates, means connecting the "0" output terminal of said first bistable circuit to the input of a second AND gate of said first pair of AND gates and to the input of a second AND gate of said second pair of AND gates, means connecting the "1" output terminal of said second bistable circuit to the input of said second AND gate of said second pair, means connecting the "0" output terminal of said second bistable circuit to the input of said first AND gate of said second pair, a first OR gate, means connecting the outputs of said second AND gate of said first pair of AND gates and said second AND gate of said second pair of AND gates to the input of said first OR gate, a second OR gate, means connecting the outputs of the first AND gate of said first pair of AND gates and the first AND gate of said second pair of AND gates to the input of said second OR gate, means connecting the output of said first OR gate to the "set" input terminals of said first bistable circuit, means connecting the output of said second OR gate to the "reset" input terminals of said first bistable circuit, means connecting the output of said first AND gate of said second pair of AND gates to the "set" input terminal of said second bistable circuit and means connecting the output of said second AND gate of said second pair of AND gates to the "reset" input terminal of said second bistable circuit, gating means responsive to said bistable circuits output signals to generate a signal whenever the algebraic sum of the input pulse train is greater than +2 units in the positive direction or −1 unit in the negative direction, counting means connected to said gating means to record the rate at which the algebraic sum of the input pulse train exceeds +2 units in the positive direction or −1 unit in the negative direction and regenerator means connected to the output of said logic circuitry to reproduce said input pulse train without a single violation.

References Cited

UNITED STATES PATENTS

| | | | |
|---|---|---|---|
| 2,996,578 | 8/1961 | Andrews | 178—70 |
| 3,045,063 | 7/1962 | Von Sanden | 178—70 |
| 3,061,814 | 10/1962 | Crater | 340—146.1 |
| 3,100,869 | 8/1963 | Disson et al. | 178—70 X |

MALCOLM A. MORRISON, *Primary Examiner.*

C. E. ATKINSON, *Assistant Examiner.*

U.S. Cl. X.R.

178—70; 340—347